United States Patent
Silverstein et al.

(10) Patent No.: US 12,184,731 B1
(45) Date of Patent: Dec. 31, 2024

(54) EXECUTING APPLICATION PROGRAMMING INTERFACE CALLS IN AN AUGMENTED REALITY ENVIRONMENT

(71) Applicant: International Business Machines Corporation, Armonk, NY (US)

(72) Inventors: Zachary A. Silverstein, Georgetown, TX (US); Logan Bailey, Atlanta, GA (US); Jeremy R. Fox, Georgetown, TX (US); David M. Cesarano, Queen Creek, AZ (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 18/342,760

(22) Filed: Jun. 28, 2023

(51) Int. Cl.
*H04L 67/131* (2022.01)
*H04L 43/04* (2022.01)

(52) U.S. Cl.
CPC ............ *H04L 67/131* (2022.05); *H04L 43/04* (2013.01)

(58) Field of Classification Search
CPC ....... H04L 67/131; H04L 43/04; H04L 67/12; H04L 67/025; G06F 3/011
See application file for complete search history.

(56) References Cited

U.S. PATENT DOCUMENTS

| | | | |
|---|---|---|---|
| 10,802,695 B2 | 10/2020 | Daniels | |
| 2016/0165170 A1* | 6/2016 | McRae | ............ H04N 21/42204 348/734 |
| 2017/0061694 A1 | 3/2017 | Giraldi | |
| 2018/0005440 A1* | 1/2018 | Mullins | ................ G06F 9/452 |

(Continued)

FOREIGN PATENT DOCUMENTS

| | | |
|---|---|---|
| AU | 2017232125 B2 | 1/2022 |
| KR | 20170046968 A | 5/2017 |
| KR | 102075383 B1 | 2/2020 |

OTHER PUBLICATIONS

Chopra, Shreya, "Virtual Control Panel API: An Artificial Intelligence Driven Directive to Allow Programmers and Users to Create Customizable, Modular, and Virtual Control Panels and Systems to Control IoT Devices via Augmented Reality", HCI International 2021—Late Breaking Papers: Multimodality, extended Reality, and Artificial Intelligence, Lecture Notes in Computer Science LNISA, vol. 13095, pp. 391-400.

(Continued)

*Primary Examiner* — Johnny B Aguiar
(74) *Attorney, Agent, or Firm* — Scott S. Dobson (57) ABSTRACT

Execution of application programming interface (API) calls from a non-adjacent augmented reality device includes monitoring network traffic in a network including one or more smart devices connected to the network. Data input corresponding to user interactions with a physical environment is captured from the one or more smart devices connected to the network. A history of API calls stored in the one or more smart devices regarding the user interactions with the physical environment are accessed, based on the network traffic monitoring and the captured data input, changes in the physical environment are identified and mapped to the history of API calls. A handshake is generated between an augmented reality device and at least one of the one or more smart devices to execute an API call from the augmented reality device to the at least one smart device based on the mapping.

20 Claims, 5 Drawing Sheets

(56) References Cited

U.S. PATENT DOCUMENTS

| | | |
|---|---|---|
| 2018/0196522 A1 | 7/2018 | Rochford |
| 2019/0129607 A1* | 5/2019 | Saurabh ................ G06F 3/011 |
| 2021/0026441 A1 | 1/2021 | Spivack |
| 2021/0132781 A1* | 5/2021 | Daniels .............. G06F 3/04847 |
| 2021/0397150 A1* | 12/2021 | Becea ................ G05B 19/042 |
| 2023/0063194 A1* | 3/2023 | Tham ................ G06F 3/04847 |

OTHER PUBLICATIONS

Disclosed Anonymously, "Augmented Reality Interface for Visualizing and interacting with IoT Devices", An IP.com Prior Art Database Technical Disclosure, IP.com No. IPCOM000255233D, IP.com Electronic Publication Date: Sep. 11, 2018, 22 pages.

IBM, "IBM Research Augmented Reality for Field Technicians," Last printed Mar. 21, 2023, 3 pages, <https://research.ibm.com/haifa/projects/imt/ar-maintenance-app/index-app.html>.

Qiang, Chai Guo, "Smart Home Appliance Control System Using Augmented Reality Technology," Final Year Project Report, Bachelor of Computer Science (Honours), Universiti Tunku Abdul Rahman, Jan. 2022, 91 pages.

\* cited by examiner

EXECUTING APPLICATION PROGRAMMING INTERFACE CALLS IN AN AUGMENTED REALITY ENVIRONMENT

BACKGROUND

The present invention generally relates to the field of augmented reality systems, and more particularly to executing application programming interface (API) calls from an augmented reality world.

In the recent years, virtual worlds have gained widespread popularity and acceptance in a variety of application domains including training, education, social networking, and conceptual demonstrations. Virtual worlds including augmented reality (AR) spaces and metaverses allow users to visually experience places in which they are not physically located. Generally, though, users can only "virtually" interact with objects they can see within the displayed virtual world.

SUMMARY

The present disclosure recognizes the shortcomings and problems associated with current techniques for executing web-based application programming interface calls from non-adjacent augmented reality systems.

Shortcomings of the prior art are overcome and additional advantages are provided through the provision of a computer-implemented method for executing application programming interface calls in a non-adjacent augmented reality world. The method includes monitoring network traffic in a network including one or more smart devices connected to the network, capturing data input from the one or more smart devices connected to the network, the data input corresponding to user interactions with a physical environment, accessing a history of API calls stored in the one or more smart devices regarding the user interactions with the physical environment, based on the network traffic monitoring and the captured data input, identifying changes in the physical environment, mapping the changes in the physical environment to the history of API calls, generating a handshake between an augmented reality device and at least one smart device of the one or more smart devices, and based on the mapping, executing, by the one or more processors, an API call from the augmented reality device to the at least one smart device.

Another embodiment of the present disclosure provides a computer system for executing application programming interface calls in a non-adjacent augmented reality world, based on the method described above.

Another embodiment of the present disclosure provides a computer program product for executing application programming interface calls in a non-adjacent augmented reality world, based on the method described above.

BRIEF DESCRIPTION OF THE DRAWINGS

The following detailed description, given by way of example and not intended to limit the invention solely thereto, will best be appreciated in conjunction with the accompanying drawings, in which.

The drawings are not necessarily to scale. The drawings are merely schematic representations, not intended to portray specific parameters of the invention. The drawings are intended to depict only typical embodiments of the invention. In the drawings, like numbering represents like elements.

DETAILED DESCRIPTION

The following description with reference to the accompanying drawings is provided to assist in a comprehensive understanding of exemplary embodiments of the invention as defined by the claims and their equivalents. The description includes various specific details to assist in that understanding, but these are to be regarded as merely exemplary, and assist in providing clarity and conciseness. Accordingly, those of ordinary skill in the art will recognize that various changes and modifications of the embodiments described herein can be made without departing from the scope and spirit of the invention. In addition, descriptions of well-known functions and constructions may be omitted.

The terms and words used in the following description and claims are not limited to the bibliographical meanings but are merely used to enable a clear and consistent understanding of the invention. Accordingly, it should be apparent to those skilled in the art that the following description of exemplary embodiments of the present invention is provided for illustration purpose only and not for the purpose of limiting the invention as defined by the appended claims and their equivalents.

It is to be understood that the singular forms "a," "an," and "the" include plural referents unless the context clearly dictates otherwise. Thus, for example, reference to "a component surface" includes reference to one or more of such surfaces unless the context clearly dictates otherwise.

Embodiments and figures of the present disclosure may have the same or similar components as other embodiments. Such figures and descriptions illustrate and explain further examples and embodiments according to the present disclosure. Embodiments of the present disclosure can include operational actions and/or procedures. A method, such as a computer-implemented method, can include a series of operational blocks for implementing an embodiment according to the present disclosure which can include cooperation with one or more systems shown in the figures. The operational blocks of the methods and systems according to the present disclosure can include techniques, mechanism, modules, and the like for implementing the functions of the operations in accordance with the present disclosure. Similar components may have the same reference numerals. Components can operate in concert with a computer implemented method.

As mentioned above, virtual worlds including augmented reality (AR) spaces and metaverses allow users to visually experience places in which they are not physically located. However, users can only "virtually" interact with objects they can see within the displayed virtual world.

The following described exemplary embodiments provide a method, system, and computer program product to, among other things, learn and execute web-based API calls in a non-adjacent AR world based on web call monitoring. Embodiments of the present disclosure may combine real and virtual worlds by allowing virtual users that are not adjacently located to physical components of the real world to interact with, and learn new functionalities of, such physical components from the AR world.

Thus, the present embodiments have the capacity to improve the technical field of augmented reality systems by allowing users of an AR system to virtually interact with one or more computing devices (i.e., smart devices, Internet of Things (IoT) devices, etc.) located in a physical environment and provide user input to the computing devices from a non-adjacent AR space including the AR system. The present embodiments may allow users to control operations of the one or more computing devices without having to directly provide user input to a user input mechanism of the computing devices. The proposed embodiments may identify and capture interactions between a user and a computing device, including a functionality of the computing device, based on collected API data, as well as provide a secure storage of API calls associated with user interactions.

Figure 1:
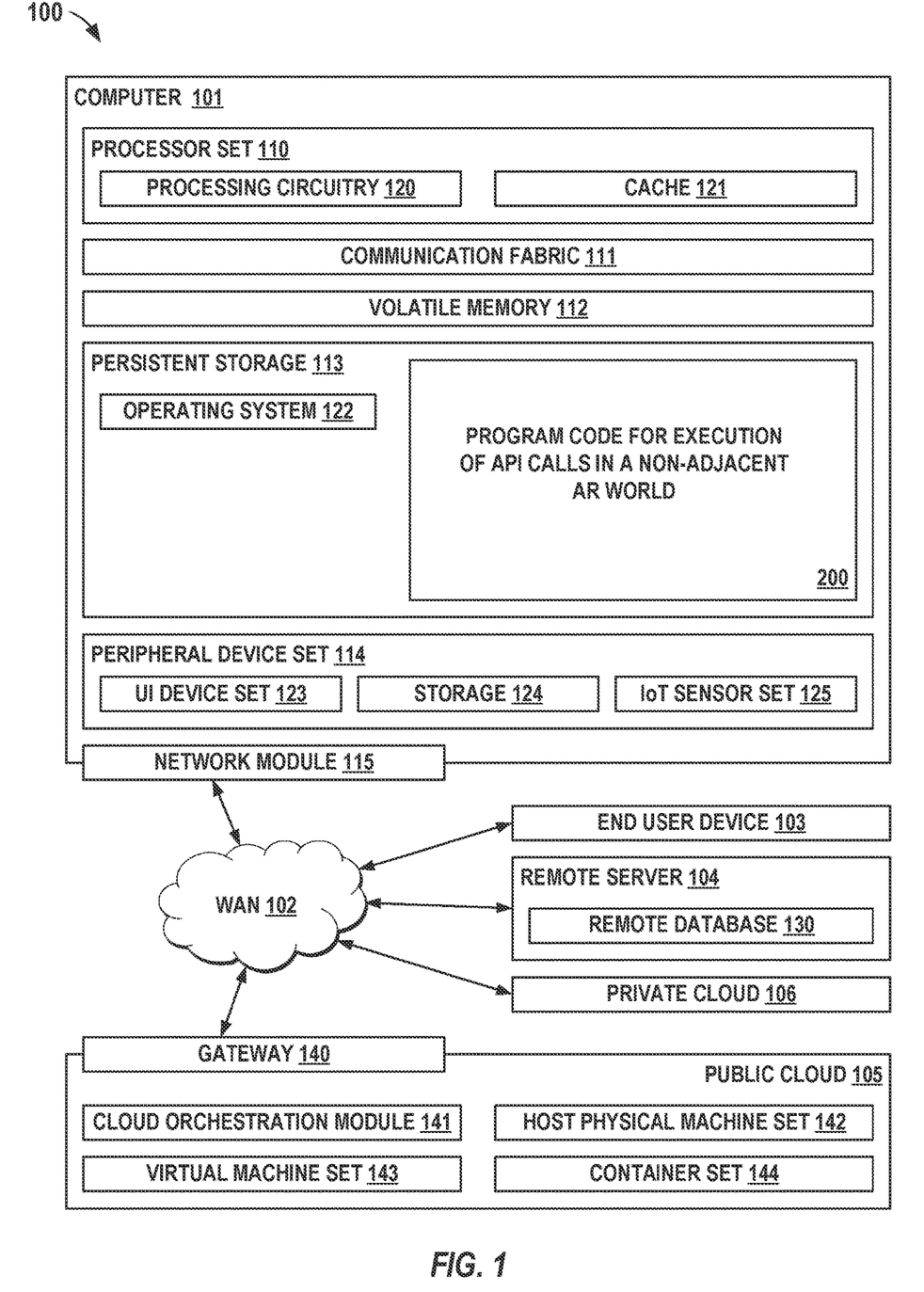
FIG. 1 is a block diagram illustrating a networked computer environment, according to an embodiment of the present disclosure.

Referring now to FIG. 1, an exemplary computing environment 100 is depicted, according to an embodiment of the present disclosure.

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation, or garbage collection, but this does not render the storage device as transitory because the data is not transitory while it is stored.

Computing environment 100 contains an example of an environment for the execution of at least some of the computer code involved in performing the inventive methods, such as the program code 200 for execution of web-based application programming interface (API) calls in a non-adjacent augmented reality (AR) world. In addition to program code 200, computing environment 100 includes, for example, computer 101, wide area network (WAN) 102, end user device (EUD) 103, remote server 104, public cloud 105, and private cloud 106. In this embodiment, computer 101 includes processor set 110 (including processing circuitry 120 and cache 121), communication fabric 111, volatile memory 112, persistent storage 113 (including operating system 122 and program code 200, as identified above), peripheral device set 114 (including user interface (UI), device set 123, storage 124, and Internet of Things (IoT) sensor set 125), and network module 115. Remote server 104 includes remote database 130. Public cloud 105 includes gateway 140, cloud orchestration module 141, host physical machine set 142, virtual machine set 143, and container set 144.

COMPUTER 101 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network, or querying a database, such as remote database 130. As is well understood in the art of computer technology, and depending upon the technology, performance of a computer-implemented method may be distributed among multiple computers and/or between multiple locations. On the other hand, in this presentation of computing environment 100, detailed discussion is focused on a single computer, specifically computer 101, to keep the presentation as simple as possible. Computer 101 may be located in a cloud, even though it is not shown in a cloud in FIG. 1. On the other hand, computer 101 is not required to be in a cloud except to any extent as may be affirmatively indicated.

PROCESSOR SET 110 includes one, or more, computer processors of any type now known or to be developed in the future. Processing circuitry 120 may be distributed over multiple packages, for example, multiple, coordinated integrated circuit chips. Processing circuitry 120 may implement multiple processor threads and/or multiple processor cores. Cache 121 is memory that is located in the processor chip package(s) and is typically used for data or code that should be available for rapid access by the threads or cores running on processor set 110. Cache memories are typically organized into multiple levels depending upon relative proximity to the processing circuitry. Alternatively, some, or all, of the cache for the processor set may be located "off chip."

In some computing environments, processor set 110 may be designed for working with qubits and performing quantum computing.

Computer readable program instructions are typically loaded onto computer 101 to cause a series of operational steps to be performed by processor set 110 of computer 101 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 121 and the other storage media discussed below. The program instructions, and associated data, are accessed by processor set 110 to control and direct performance of the inventive methods. In computing environment 100, at least some of the instructions for performing the inventive methods may be stored in program code 200 in persistent storage 113.

COMMUNICATION FABRIC 111 is the signal conduction paths that allow the various components of computer 101 to communicate with each other. Typically, this fabric is made of switches and electrically conductive paths, such as the switches and electrically conductive paths that make up busses, bridges, physical input/output ports and the like. Other types of signal communication paths may be used, such as fiber optic communication paths and/or wireless communication paths.

VOLATILE MEMORY 112 is any type of volatile memory now known or to be developed in the future. Examples include dynamic type random access memory (RAM) or static type RAM. Typically, the volatile memory is characterized by random access, but this is not required unless affirmatively indicated. In computer 101, the volatile memory 112 is located in a single package and is internal to computer 101, but, alternatively or additionally, the volatile memory may be distributed over multiple packages and/or located externally with respect to computer 101.

PERSISTENT STORAGE 113 is any form of non-volatile storage for computers that is now known or to be developed in the future. The non-volatility of this storage means that the stored data is maintained regardless of whether power is being supplied to computer 101 and/or directly to persistent storage 113. Persistent storage 113 may be a read-only memory (ROM), but typically at least a portion of the persistent storage allows writing of data, deletion of data and re-writing of data. Some familiar forms of persistent storage include magnetic disks and solid-state storage devices. Operating system 122 may take several forms, such as various known proprietary operating systems or open-source Portable Operating System Interface type operating systems that employ a kernel. The code included in program code 200 typically includes at least some of the computer code involved in performing the inventive methods.

PERIPHERAL DEVICE SET 114 includes the set of peripheral devices of computer 101. Data communication connections between the peripheral devices and the other components of computer 101 may be implemented in various ways, such as Bluetooth connections, Near-Field Communication (NFC) connections, connections made by cables (such as universal serial bus (USB) type cables), insertion type connections (for example, secure digital (SD) card), connections made though local area communication networks and even connections made through wide area networks such as the internet. In various embodiments, UI device set 123 may include components such as a display screen, speaker, microphone, wearable devices (such as goggles and smart watches), keyboard, mouse, printer, touchpad, game controllers, and haptic devices. Storage 124 is external storage, such as an external hard drive, or insertable storage, such as an SD card. Storage 124 may be persistent and/or volatile. In some embodiments, storage 124 may take the form of a quantum computing storage device for storing data in the form of qubits. In embodiments where computer 101 is required to have a large amount of storage (for example, where computer 101 locally stores and manages a large database) then this storage may be provided by peripheral storage devices designed for storing very large amounts of data, such as a storage area network (SAN) that is shared by multiple, geographically distributed computers. IoT sensor set 125 is made up of sensors that can be used in Internet of Things applications. For example, one sensor may be a thermometer and another sensor may be a motion detector.

NETWORK MODULE 115 is the collection of computer software, hardware, and firmware that allows computer 101 to communicate with other computers through WAN 102. Network module 115 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 115 are performed on the same physical hardware device. In other embodiments (for example, embodiments that utilize software-defined networking (SDN)), the control functions and the forwarding functions of network module 115 are performed on physically separate devices, such that the control functions manage several different network hardware devices. Computer readable program instructions for performing the inventive methods can typically be downloaded to computer 101 from an external computer or external storage device through a network adapter card or network interface included in network module 115.

WAN 102 is any wide area network (for example, the internet) capable of communicating computer data over non-local distances by any technology for communicating computer data, now known or to be developed in the future. In some embodiments, the WAN may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

END USER DEVICE (EUD) 103 is any computer system that is used and controlled by an end user (for example, a customer of an enterprise that operates computer 101) and may take any of the forms discussed above in connection with computer 101. EUD 103 typically receives helpful and useful data from the operations of computer 101. For example, in a hypothetical case where computer 101 is designed to provide a recommendation to an end user, this recommendation would typically be communicated from network module 115 of computer 101 through WAN 102 to EUD 103. In this way, EUD 103 can display, or otherwise present, the recommendation to an end user. In some embodiments, EUD 103 may be a client device, such as thin client, heavy client, mainframe computer, desktop computer and so on. According to an embodiment, the program code 200 is communicatively connected to IoT sensor set 125 and EUD 103 via WAN 102 for actively monitoring, upon user's approval, a network traffic on a user's side and interactions between the user and IoT sensor set 125.

REMOTE SERVER 104 is any computer system that serves at least some data and/or functionality to computer 101. Remote server 104 may be controlled and used by the same entity that operates computer 101. Remote server 104 represents the machine(s) that collect and store helpful and useful data for use by other computers, such as computer 101. For example, in a hypothetical case where computer 101 is designed and programmed to provide a recommendation based on historical data, then this historical data may be provided to computer 101 from remote database 130 of remote server 104.

PUBLIC CLOUD 105 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economics of scale. The direct and active management of the computing resources of public cloud 105 is performed by the computer hardware and/or software of cloud orchestration module 141. The computing resources provided by public cloud 105 are typically implemented by virtual computing environments that run on various computers making up the computers of host physical machine set 142, which is the universe of physical computers in and/or available to public cloud 105. The virtual computing environments (VCEs) typically take the form of virtual machines from virtual machine set 143 and/or containers from container set 144. It is understood that these VCEs may be stored as images and may be transferred among and between the various physical machine hosts, either as images or after instantiation of the VCE. Cloud orchestration module 141 manages the transfer and storage of images, deploys new instantiations of VCEs and manages active instantiations of VCE deployments. Gateway 140 is the collection of computer software, hardware, and firmware that allows public cloud 105 to communicate through WAN 102.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

PRIVATE CLOUD 106 is similar to public cloud 105, except that the computing resources are only available for use by a single enterprise. While private cloud 106 is depicted as being in communication with WAN 102, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 105 and private cloud 106 are both part of a larger hybrid cloud.

Figure 2:
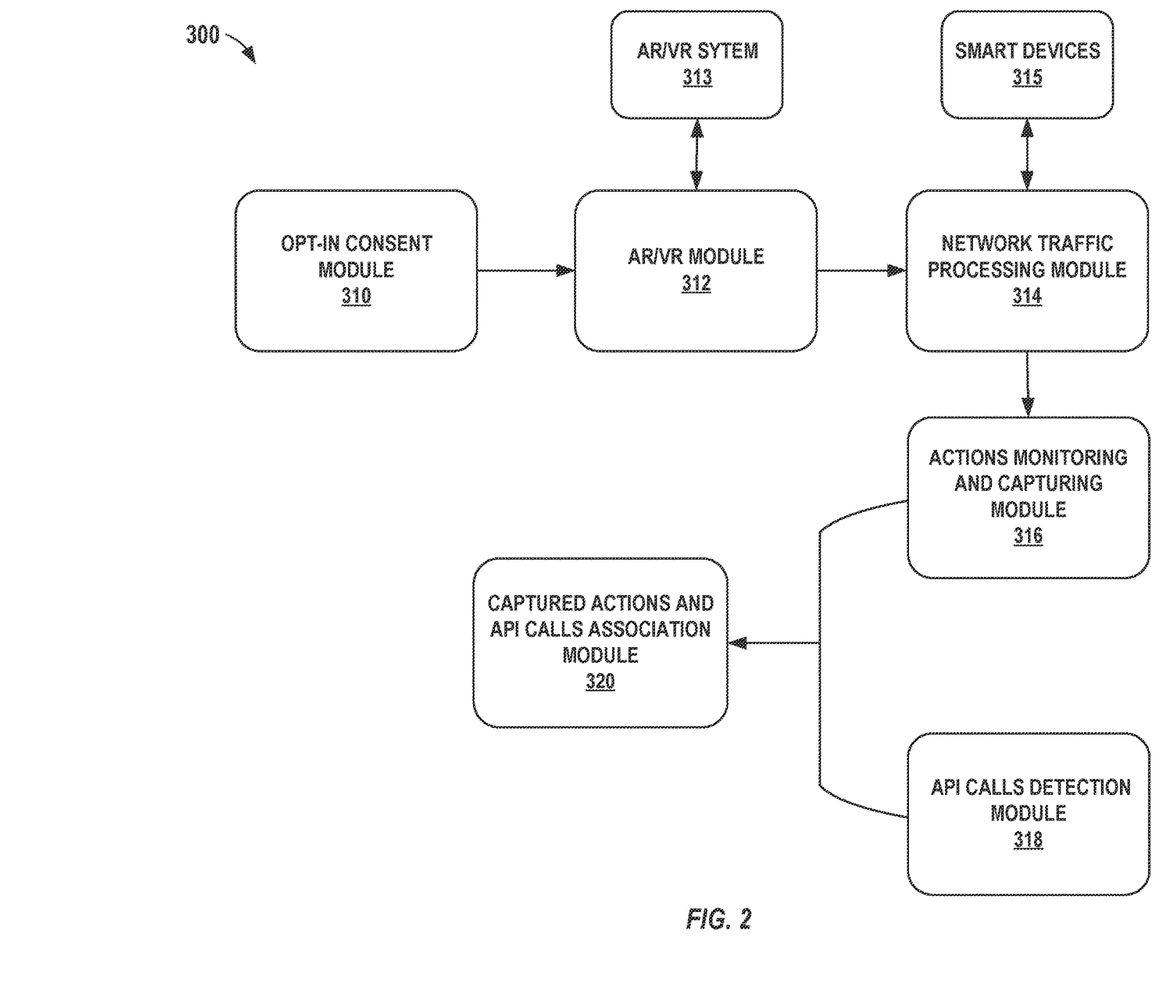
FIG. 2 is a functional block diagram depicting components of a computer system for executing web-based application programming interface calls in a non-adjacent augmented reality world, according to an embodiment of the present disclosure.

Referring now to FIG. 2, a functional block diagram 300 depicting components of a computer system for executing the program code 200 is shown, according to an embodiment of the present disclosure. FIG. 2 provides only an illustration of one implementation and does not imply any limitations with regard to the environments in which different embodiments may be implemented. Many modifications to the depicted environment may be made by those skilled in the art without departing from the scope of the invention as recited by the claims.

Functional block diagram 300 includes a first sequence of operational steps for executing the program code 200. Particularly, in one or more embodiments, the computer system depicted by functional block diagram 300 includes an opt-in consent module 310 through which user(s) may or may not opt into the program code 200. This action may allow an augmented reality (AR)/virtual reality (VR) module 312 to interact with the real world on each user's side through an AR/VR system 313 associated with one or more of the users of program code 200. Thus, according to an embodiment, the AR/VR module 312 of the computer system for executing program code 200 is communicatively connected to the AR/VR system 313 via a network (i.e., WAN 102) to allow users to interact with the physical world. In an exemplary embodiment, the AR/VR system 313 may include an AR/VR headset. The AR/VR system 313 can be public or private.

Functional block diagram 300 further includes a network traffic processing module 314 for monitoring and processing network traffic on the user's side. According to an embodiment, the network traffic processing module 314 resides at the network side for monitoring an activity of the user including traffic monitoring rights. In some embodiments, the network traffic processing module 314 may only find or know discoverable API endpoints or Bluetooth endpoints via device pairing. For example, network traffic processing module 314 is capable of detecting API calls performed by the user from one or more smart devices 315 via the network. Smart devices 315 may include one or more IoT devices (e.g., IoT sensor set 125) such as, for example, smartphones, smart speakers, smart cars, smart thermostats, smart doorbells, smart locks, smart refrigerators, phablets and tablets, smartwatches, smart bands, smart keychains, smart glasses, and the like.

Functional block diagram 300 further includes actions monitoring and capturing module 316 for monitoring actions performed by the users in the real world (e.g., using smart devices 315) and associating these actions to 1) API calls made by the user over the network detected by API calls detection module 318, and 2) actions as seen visually by the user in the physical space through, for example, an external camera communicatively connected to the network. In some embodiments, the external camera may be included in the AR/VR system 313. It should be noted that data collection (e.g., from IoT devices, AR/VR devices, etc.) is done with user's consent via, for example, an opt-in and opt-out feature. The user can choose to stop having his/her information being collected or used. In some embodiments, the user can be notified each time data is being collected.

The collected data is envisioned to be secured and not shared with anyone without previous consent. The user can stop data collection at any time.

Functional block diagram 300 further includes a captured actions and API calls association module 320 for associating user's actions and API calls to detected changes in a physical context of the user. In response to the association of user's actions and API calls to detected changes in the physical context, the captured actions and API calls association module 320 generates a handshake with at least one smart device 315 associated with the user. The captured actions and API calls association module 320 captures transactions and API calls and associates them to changes in current physical context including, for example, predefined contexts (e.g., lights on/off), learned contexts (e.g., door opening/closing), user annotated contexts, and user provided feedback and context.

In one or more embodiments, open-source APIs and handshakes can be performed from the AR/VR system 313 side, while opt-ed in, device communication can be allowed from the smart devices 315 side. In some embodiments, API calls to elements may be limited based on what the user is authorized to perform.

Thus, the computer system depicted by the functional block diagram 300 is capable of monitoring network traffic on the user's side and allow API calls to one or more of the smart devices 315 from the AR/VR System 313 based on learning of interaction behavior of the user with a surrounding physical environment. The computer system may identify elements or components on at least one smart device 315 (or a physical device) and programmatically generate secure certificates to perform API calls from the AR/VR System 313. In some embodiments, the computer system of FIG. 3 may authorize elements on a smart device 315 (or physical device) to be used by the AR/VR System 313.

Figure 3:
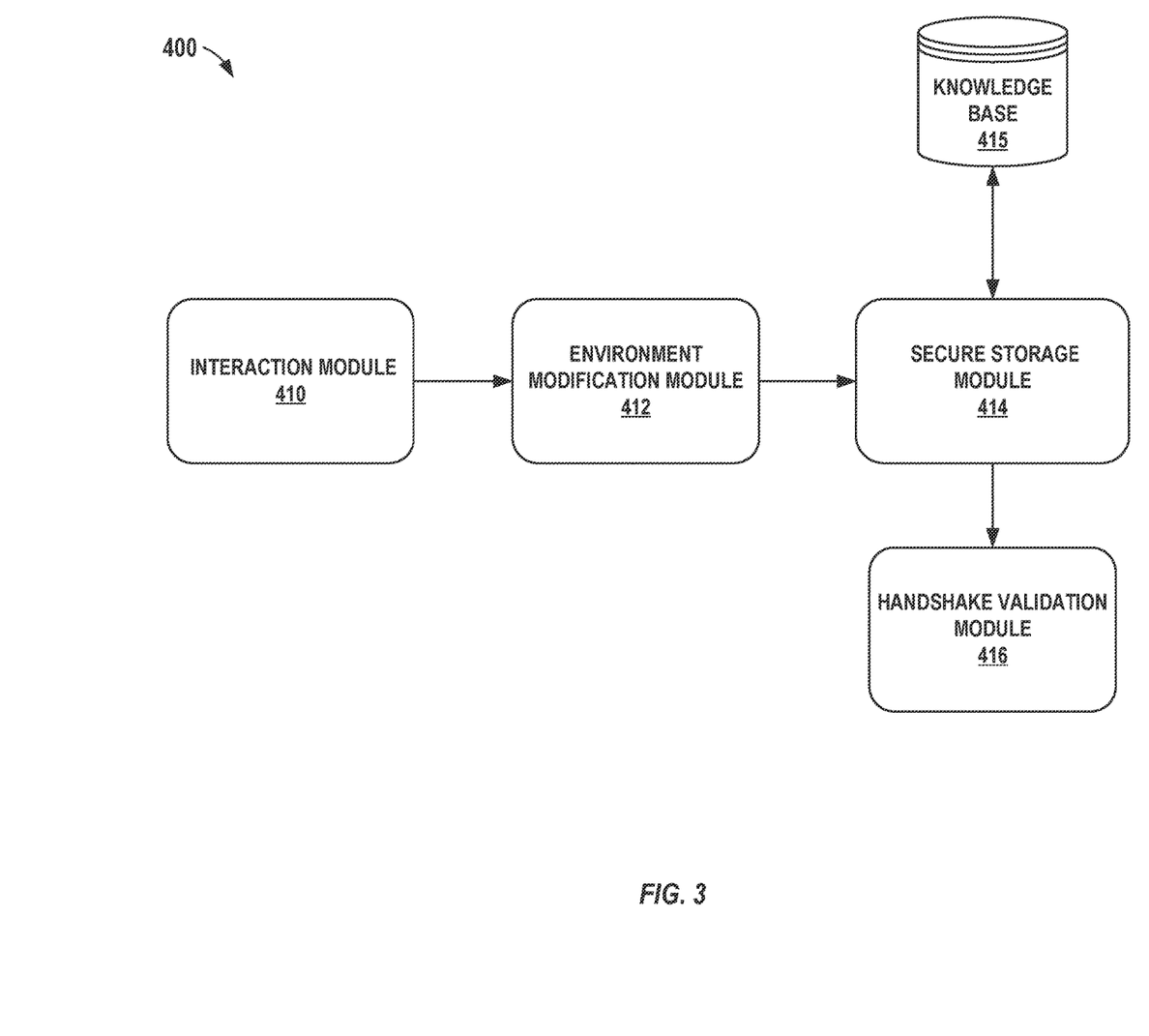
FIG. 3 is a functional block diagram depicting additional components of the computer system for executing web-based application programming interface calls in a non-adjacent augmented reality world, according to an embodiment of the present disclosure.

Referring now to FIG. 3, a functional block diagram 400 depicting additional components of the computer system for executing the program code 200 is shown. FIG. 3 provides only an illustration of one implementation and does not imply any limitations with regard to the environments in which different embodiments may be implemented. Many modifications to the depicted environment may be made by those skilled in the art without departing from the scope of the invention as recited by the claims.

Functional block diagram 400 includes a second sequence of operational steps for executing the program code 200. Particularly, in one or more embodiments, the computer system depicted by functional block diagram 400 includes an interaction module 410 for identifying user interactions with one or more of the smart devices 315 and a corresponding functionality of each smart device 315 based on the API calls detected by the API calls detection module 318 shown in FIG. 3. Responsive to the identified user interactions with the one or more smart devices 315, an environment modification module 412, correlates the user interactions and detected API calls with current changes in the physical environment of the user.

Functional block diagram 400 further includes a secure storage module 414 for generating a secure storage of detected API calls and associated functionality on each user's end. In some embodiments, based on user's preferences, an AR o metaverse world may or may not have access to this functionality. Accordingly, the secure storage module 414 includes a history of user interactions with a plurality of smart devices 315 and detected API calls performed from one or more of the smart devices 315. In some embodiments, the secure storage module 414 is communicatively connected to a knowledge base 415 of user interactions and API calls conducted by the user over a network.

Functional block diagram 400 further includes a handshake validation module 416 for executing a web-based API call from the user's AR/VR system 313 to at least one of the smart devices 315 used to trigger the API calls previously detected by the API calls detection module 318. As known by those skilled in the art, a web-based API (Application Programming Interface) is a set of specifications and standards used to facilitate communication between different software components or services on the web. It defines a set of rules and structures that programs can follow to interact with one another. Web-based APIs are the foundation for sharing data, logic, and processes within an application ecosystem. These APIs define how a program receives input, processes output, and enables collaborations among multiple services and application components. Web-based APIs allow developers to create seamless integrations and collaborations between different programs and websites while maintaining the integrity of each service.

Thus, when the user views or interacts with a smart device 315 storing a known API call, the handshake validation module 416 validates a handshake between the smart device 315 and the AR/VR system 313 to provide the user, via the AR/VR system 313, a list of potential action items that can be executed in the smart device 315 based on the stored history of API calls and learned events. In one or more embodiments, the list of potential action items may include an input menu of available executable functions in the smart device 315. Accordingly, users of the depicted computer system for executing program code 200 can provide instructions to one or more smart devices 315 located in a non-adjacent physical environment from the AR/VR system 313.

According to an embodiment, components of the computer system for executing program code 200 described above with reference to FIG. 2 and FIG. 3 are capable of learning and executing API calls in a non-adjacent AR world based on web call monitoring. The computer system in FIGS. 2-3 monitors network traffic for detection and contextualization of API calls, securely storing them, and conducting handshake validation upon AR element interaction.

Figure 4:
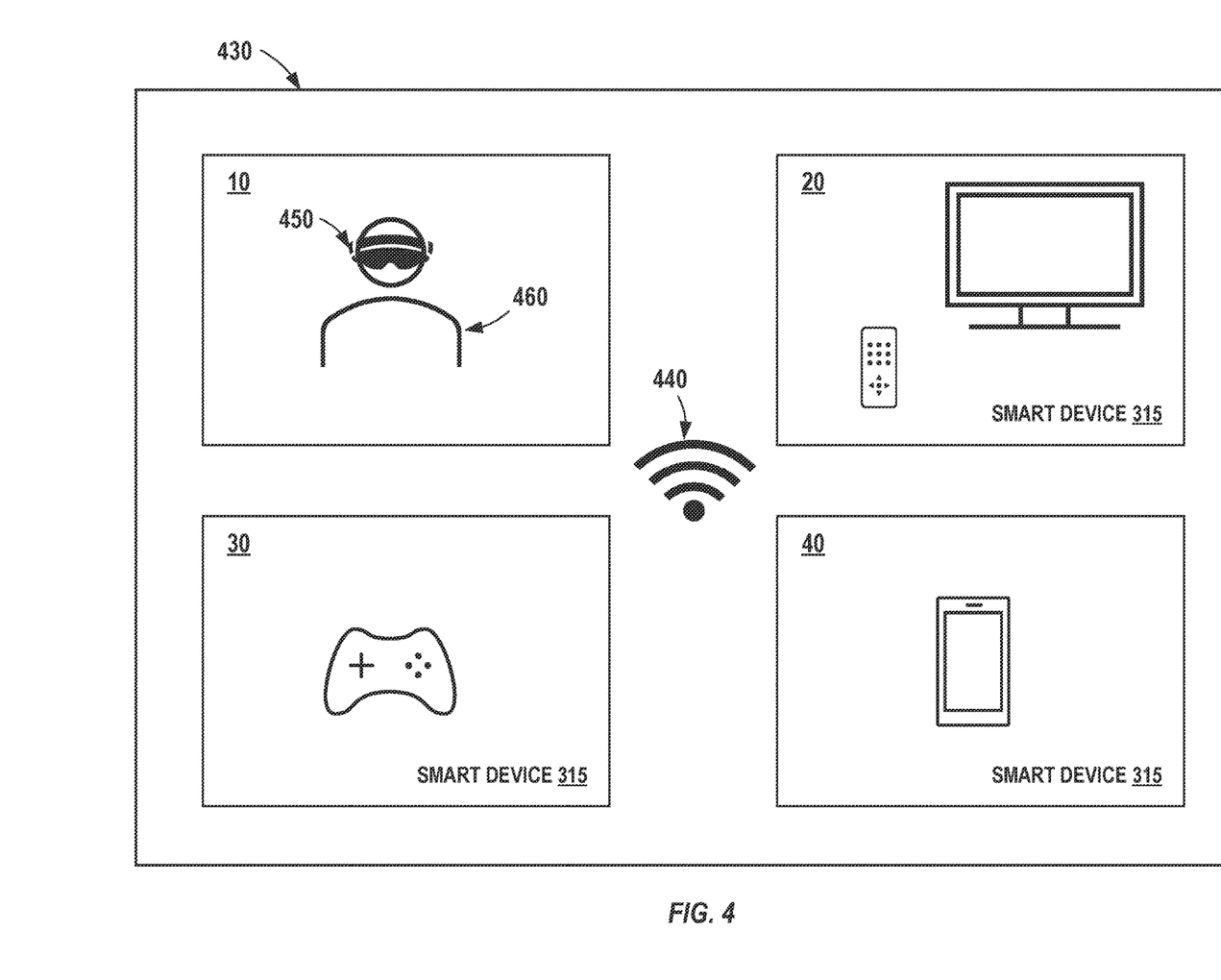
FIG. 4 depicts an example of an implementation of the computer system for executing web-based application programming interface calls in a non-adjacent augmented reality world, according to an embodiment of the present disclosure.

Referring now to FIG. 4, an example 430 of an implementation of the computer system for executing program code 200 described above with reference to FIG. 2 and FIG. 3 is shown, according to an embodiment of the present disclosure. FIG. 4 provides only an illustration of one implementation and does not imply any limitations with regard to the environments in which different embodiments may be implemented. Many modifications to the depicted environment may be made by those skilled in the art without departing from the scope of the invention as recited by the claims.

In the depicted example, user 460 wears an AR headset 450. The user 460 is located at a first location 10. A plurality of smart devices 315 associated with the user 460 are located in second, third, and fourth locations 20, 30, and 40, respectively. The second, third, and fourth locations 20, 30, and 40 are non-adjacent to the location 10 of the user 460 wearing the AR headset 450. Each of the smart devices 315 are communicatively connected to the AR headset 450 via the network 440. Prior consent from the user 460, program code 200 actively monitors the network traffic for identifying and capturing API data corresponding to API calls performed by the user 460 from one or more of the smart devices 315 over network 440.

Program code 200 further identifies and captures interactions of user 460 with each of the smart device 315 in addition to a functionality of each smart device 315. For example, smart device 315 in location 20 includes a smart remote control. While user 460 operates the smart remote control, program code 200 detects the network traffic and correlates it with the interaction of user 460 with the smart remote control (i.e., smart device 15 in location 20).

Program code 200 maps captured API data and user interaction to the corresponding smart device 315 (e.g., smart remote control) and stores a history of API calls, learned user events and API mapping for future use. Accordingly, each time user 460 interacts with at least one of the smart devices 315 storing a known API call, program code 200 validates a handshake and provides user 460, via AR headset 450, a list of potential action items that can be executed based on the mapping and stored history of API calls.

Thus, program code 200 allows user 460 to virtually interact with one or more smart devices 315 by providing user input to the smart devices 315 from a remote augmented-reality device (e.g., AR headset 450). This enables user 460 to control operations of the smart devices 315 without having to (physically) provide user input to a user input mechanism tied to the smart devices. The proposed two-step process allows program code 200 to identify and capture the artifact (i.e., smart device 315) interacted with and its functionality as recognized based on the collected APIs, as well as provide a secure storage of API calls associated with user interactions.

Figure 5:
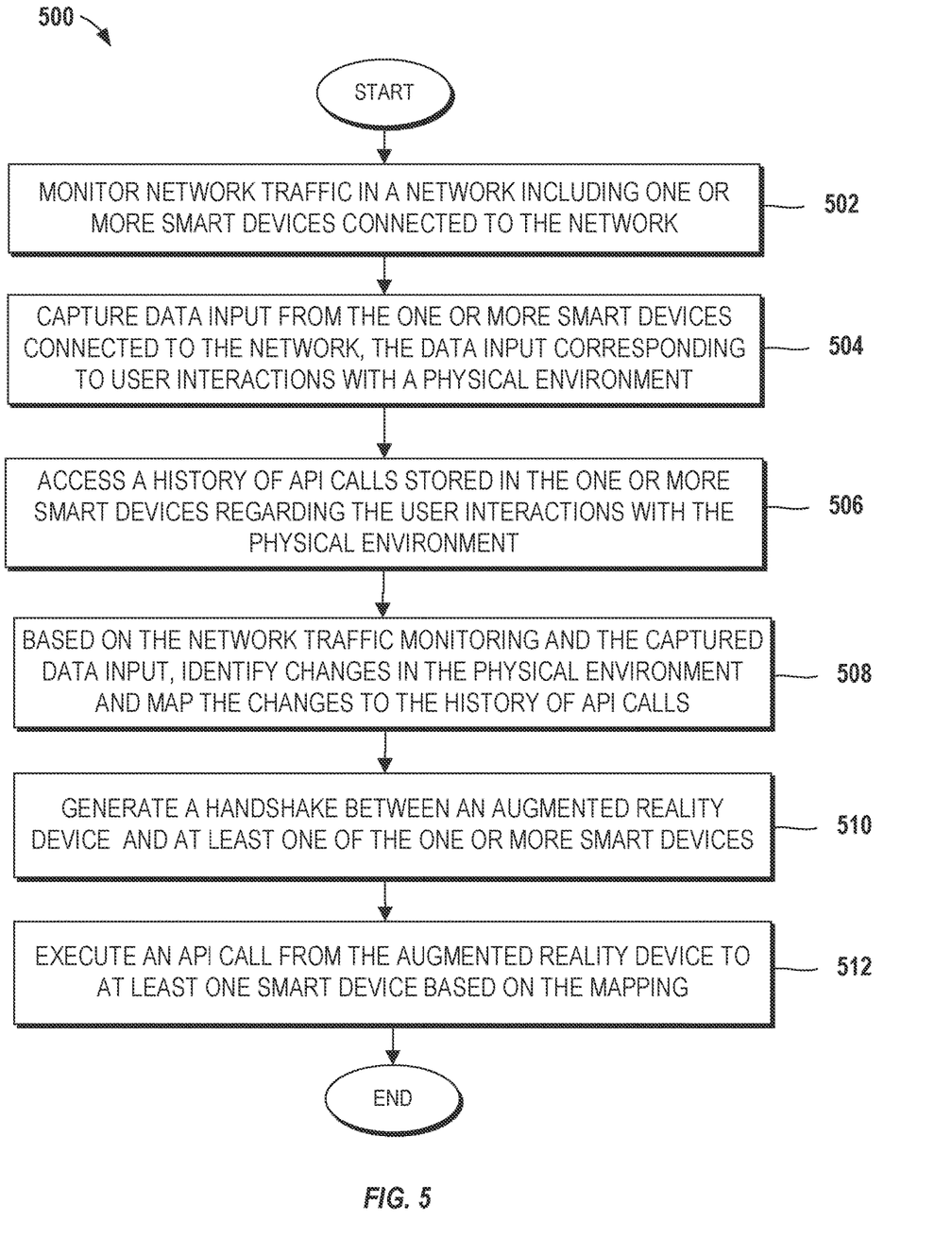
FIG. 5 depicts a flowchart illustrating the steps of a computer-implemented method for executing web-based application programming interface calls in a non-adjacent augmented reality world, according to an embodiment of the present disclosure.

Referring now to FIG. 5, a flowchart 500 illustrating operational steps of a computer-implemented method for executing web-based API calls in a non-adjacent augmented reality world is shown, according to an embodiment of the present disclosure. FIG. 5 provides only an illustration of one implementation and does not imply any limitations with regard to the environments in which different embodiments may be implemented. Many modifications to the depicted environment may be made by those skilled in the art without departing from the scope of the invention as recited by the claims.

The process starts at block 502 by, responsive to one or more smart devices integrating on a network, monitoring a network traffic. Network monitoring occurs after a user opts-in into the program code 200 for execution of web-based API calls in a non-adjacent AR world. Accordingly, program code 200 monitors network traffic in the network including the one or more devices connected to the network.

At block 504, program code 200 captures interactions of the user with a physical environment. In one or more embodiment, the user's interactions are performed using the one or more smart devices connected to the network. In other embodiments, user's interactions with the physical environment can be determined using a physical device. In some embodiments, program code 200 learns a behavior of the user based on contextual camera processing of the physical environment. More particularly, program code 200 captures data input from the one or more devices connected to the network, with the data input corresponding to user interactions with the physical environment.

At block 506, program code 200 detects a history of API calls performed by the user from the one or more smart devices via the network. Specifically, program code 200 access a history of API calls stored in the one or more devices regarding the user interactions with the physical environment. In an embodiment, program code 200 securely stores the history of API calls and the captured user interactions for future use.

At block 508, program code 200 identifies changes in the physical environment based on the network traffic monitoring and the captured data input. Program code 200 then maps the identified changes in the physical environment to the history of API calls. Changes in the physical context may include, but are not limited to, one or more of predefined contexts, learned contexts, and user annotated contexts.

At block 510, program code 200 generates a handshake between an augmented reality device associated with the user and at least one of the one or more smart devices. According to an embodiment, the physical environment may be separated by a distance from an augmented reality space including the augmented reality device. Stated differently, the physical environment and the augmented reality space are non-adjacent or physically connected.

At block 512, program code 200 executes an API call from the augmented reality device to at least one smart device based on the mapping. In an embodiment, program code 200 identifies elements on the at least one smart device and programmatically generates a certificate for performing the API call from the augmented reality device. Accordingly, program code 200 authorizes the identified elements on the at least one smart device to be used by the augmented reality device. In one or more embodiments, program code 200 further generates and provides, via the augmented reality device, a list of potential action items to be executed in the at least one smart device based on the mapping and the history of API calls.

Therefore, embodiments of the present invention provide a method, system, and computer program product for executing web-based API calls in a non-adjacent AR world based on web call monitoring. The present embodiments allow a user to interact with a computing device in a unified manner without using different user input mechanisms. The present embodiments can monitor and detect traffic across a network and process contextual camera information to learn the behavior of a user. The present embodiments can identify elements on a smart device or physical device and generate secure certificates for calls made by an augmented reality system, as well as authorize elements on the smart device or physical device to be used by the augmented reality system. The present embodiments can predict events for new to-be-acquired tooling/applications and render the web-based API calls in relation to the real-world artifact used to trigger the calls.

Embodiments of the present invention may further translate user input into different control signals that may be recognized by the particular computing device (e.g., smart devices) with which the user is interacting, recognize, translate, and map control signals/commands received from the augmented-reality device, and providing a communication platform that allows listener components of display devices to recognize control signals/commands received from the augmented-reality device.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The present invention may be a system, a method, and/or a computer program product. The computer program product may include a computer readable storage medium (or media) having computer readable program instructions thereon for causing a processor to carry out aspects of the present invention.

Computer readable program instructions described herein may be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, may be implemented by computer readable program instructions.

These computer readable program instructions may be provided to a processor of a general-purpose computer, a special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that may direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus, or other device to produce a computer implemented process, such that the instructions which execute on the computer, other programmable apparatus, or other device implement the functions/acts specified in the flowchart and/or block diagram block or blocks.

The flowchart and block diagrams in the Figures (i.e., FIG.) illustrate the architecture, functionality, and operation of possible implementations of systems, methods, and computer program products according to various embodiments of the present invention. In this regard, each block in the flowchart or block diagrams may represent a module, a segment, or a portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, may be implemented by special purpose hardware-based systems that perform the specified functions or acts or carry out combinations of special purpose hardware and computer instructions.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A computer-implemented method for executing application programming interface (API) calls, the computer-implemented method comprising:
    monitoring, by one or more processors, network traffic in a network including one or more smart devices connected to the network;
    capturing, by the one or more processors, data input from the one or more smart devices connected to the network, the data input corresponding to user interactions with a physical environment;
    accessing, by the one or more processors, a history of API calls stored in the one or more smart devices regarding the user interactions with the physical environment;
    based on the network traffic monitoring and the captured data input, identifying, by the one or more processors, changes in the physical environment;
    mapping, by the one or more processors, the changes in the physical environment to the history of API calls;
    generating, by the one or more processors, a handshake between an augmented reality device and at least one smart device of the one or more smart devices; and
    based on the mapping, executing, by the one or more processors, an API call from the augmented reality device to the at least one smart device.

2. The computer-implemented method of claim 1, further comprising:
  learning, by the one or more processors, a user behavior based on contextual camera processing of the physical environment, the physical environment being separated by a distance from an augmented reality space including the augmented reality device.

3. The computer-implemented method of claim 1, further comprising:
  identifying, by the one or more processors, elements on the at least one smart device; and
  programmatically generating, by the one or more processors, a certificate for performing the API call from the augmented reality device.

4. The computer-implemented method of claim 3, further comprising:
  authorizing, by the one or more processors, the elements on the at least one smart device to be used by the augmented reality device.

5. The computer-implemented method of claim 1, further comprising:
  storing, by the one or more processors, the history of API calls and the user interactions.

6. The computer-implemented method of claim 1, wherein the changes in the physical environment include one or more of predefined contexts, learned contexts, and user annotated contexts.

7. The computer-implemented method of claim 1, further comprising:
  providing, by the one or more processors, via the augmented reality device, a list of potential action items to be executed in the at least one smart device based on the mapping and the history of API calls.

8. A computer system for executing application programming interface (API) calls, comprising:
  one or more processors, one or more computer-readable memories, one or more computer-readable tangible storage devices, and program instructions stored on at least one of the one or more storage devices for execution by at least one of the one or more processors via at least one of the one or more memories, wherein the computer system is capable of performing a method comprising:
    monitoring, by the one or more processors, network traffic in a network including one or more smart devices connected to the network;
    capturing, by the one or more processors, data input from the one or more smart devices connected to the network, the data input corresponding to user interactions with a physical environment;
    accessing, by the one or more processors, a history of API calls stored in the one or more smart devices regarding the user interactions with the physical environment;
    based on the network traffic monitoring and the captured data input, identifying, by the one or more processors, changes in the physical environment;
    mapping, by the one or more processors, the changes in the physical environment to the history of API calls;
    generating, by the one or more processors, a handshake between an augmented reality device and at least one smart device of the one or more smart devices; and
    based on the mapping, executing, by the one or more processors, an API call from the augmented reality device to the at least one smart device.

9. The computer system of claim 8, further comprising:
  learning, by the one or more processors, a user behavior based on contextual camera processing of the physical environment, the physical environment being separated by a distance from an augmented reality space including the augmented reality device.

10. The computer system of claim 8, further comprising:
  identifying, by the one or more processors, elements on the at least one smart device; and
  programmatically generating, by the one or more processors, a certificate for performing the API call from the augmented reality device.

11. The computer system of claim 10, further comprising:
  authorizing, by the one or more processors, the elements on the at least one smart device to be used by the augmented reality device.

12. The computer system of claim 8, further comprising:
  storing, by the one or more processors, the history of API calls and the user interactions.

13. The computer system of claim 8, wherein the changes in the physical environment include one or more of predefined contexts, learned contexts, and user annotated contexts.

14. The computer system of claim 8, further comprising:
  providing, by the one or more processors, via the augmented reality device, a list of potential action items to be executed in the at least one smart device based on the mapping and the history of API calls.

15. A computer program product for executing application programming interface (API) calls, comprising:
  one or more computer readable storage media, and program instructions collectively stored on the one or more computer readable storage media, the program instructions comprising:
    program instructions to monitor, by one or more processors, network traffic in a network including one or more smart devices connected to the network;
    program instructions to capture, by the one or more processors, data input from the one or more smart devices connected to the network, the data input corresponding to user interactions with a physical environment;
    program instructions to access, by the one or more processors, a history of API calls stored in the one or more smart devices regarding the user interactions with the physical environment;
    based on the network traffic monitoring and the captured data input, program instructions to identify, by the one or more processors, changes in the physical environment;
    program instructions to map, by the one or more processors, the changes in the physical environment to the history of API calls;
    program instructions to generate, by the one or more processors, a handshake between an augmented reality device and at least one smart device of the one or more smart devices; and
    based on the mapping, program instructions to execute, by the one or more processors, an API call from the augmented reality device to the at least one smart device.

16. The computer program product of claim 15, further comprising:
  program instructions to learn, by the one or more processors, a user behavior based on contextual camera processing of the physical environment, the physical environment being separated by a distance from an augmented reality space including the augmented reality device.

17. The computer program product of claim 15, further comprising:
    program instructions to identify, by the one or more processors, elements on the at least one smart device; and
    program instructions to programmatically generate, by the one or more processors, a certificate for performing the API call from the augmented reality device.

18. The computer program product of claim 17, further comprising:
    program instructions to authorize, by the one or more processors, the elements on the at least one smart device to be used by the augmented reality device.

19. The computer program product of claim 15, further comprising:
    program instructions to store, by the one or more processors, the history of API calls and the user interactions; and
    program instructions to provide, by the one or more processors, via the augmented reality device, a list of potential action items to be executed in the at least one smart device based on the mapping and the history of API calls.

20. The computer program product of claim 15, wherein the changes in the physical environment include one or more of predefined contexts, learned contexts, and user annotated contexts.

* * * * *